United States Patent [19]

Boring

[11] 4,200,415
[45] Apr. 29, 1980

[54] MATERIAL LOADING DEVICE

[75] Inventor: Douglas J. Boring, Franklin, Pa.

[73] Assignee: Conair, Inc., Franlkin, Pa.

[21] Appl. No.: 930,715

[22] Filed: Aug. 3, 1978

[51] Int. Cl.² ............................................. B65G 53/60
[52] U.S. Cl. ..................................... 406/173; 55/345; 55/425
[58] Field of Search ..................... 302/59, 62; 55/345, 55/425; 406/168, 169, 173

[56] References Cited

U.S. PATENT DOCUMENTS 1,448,430  3/1923  Brown ................................ 302/62 X

FOREIGN PATENT DOCUMENTS 500759  6/1930  Fed. Rep. of Germany ............. 55/425
1355017  2/1964  France ......................................... 55/345
709357  5/1954  United Kingdom ....................... 302/62

Primary Examiner—Jeffrey V. Nase

[57] ABSTRACT

A material loading device and more particularly a device for the transportation of pulverant, finely divided or granular material from a source of such material to a material receiving loader and which includes an improved structure for collecting lightweight fines which separate from the main material stream and reintroducing substantially all of such fines to the material receiving hopper of the loader.

6 Claims, 3 Drawing Figures

MATERIAL LOADING DEVICE

In many industries, such as the plastics industry, it is common practice to transport finely divided, granular or pulverant material from one or more storage bins, through one or more feedlines having a free end embedded in or otherwise in communication with the respective materials to be transported, to a material receiving hopper of a loader by creating a vacuum in the loader. The resultant airflow occurring due to the vacuum is through the material and the one or more feedpipes entrains the material in the airstream flowing to the receiving loader. The airstream carrying the material entrained therein enters the loader and the entrained material is deposited in the loader material receiving hopper while the air is withdrawn from the loader by a vacuum pump. After the receiving hopper has been loaded and the vacuum discontinued the material deposited therein is subsequently discharged into a material receiving compartment of any suitable apparatus such as a processing hopper for a machine subsequently processing the material.

In material transporting devices or loaders such as the type described above large amounts of lightweight fines frequently exist in the material being transported. When these fines reach the loader a substantial portion will not follow the normal material flow path to the receiving hopper of the loader because of the lightweight thereof and would tend to remain in the air withdrawn from the loader by the vacuum pump. Should the fines flow from the loader through the exit conduits to the vacuum pump, substantial operating problems, such as poor pump performance and a high probability of pump damage, may result.

To alleviate the above described problem due to lightweight fines many transporting systems utilized heretofore included a primary receiving hopper having a tangential material entry or a conventional receiving hopper with a horizontal material entry. These systems were designed to cause a portion of fines to settle with the normal material flow into the receiving hopper of the loader, rather than remaining entrained in the air being withdrawn from the loader, by creating a more or less single stage turbulent flow and/or cyclonic action within the receiving hopper. These prior systems additionally often included a filter media such as a flat cloth disc filter, a cartridge filter, cloth bag filter or a metal screen filter adjacent the vacuum connection to the receiving hopper to prevent the continuously entrained fines in the airstream from flowing to the vacuum pump.

In separating the fines from the conveying airflow with transporting systems such as described hereinabove, certain inherent problems result, such as:

1. Reduced material flow rate due to gradually increasing pressure drops across the filters as they became increasingly clogged with fines.
2. Rough material flow, surging and line plugging due to dirty filters which interfere with airflow.
3. Substantial maintenance problems and expense necessitated by frequent requirements of filter cleaning or replacement. In this regard, it is noted that in a typical plastics transporting device which transports five hundred pounds of pulverant per hour, it is not unusual to require filter maintenance every eight hours with present systems.
4. Damaged vacuum or pressure pumps caused by incorrectly installed or missing filters.
5. Increased maintenance risk resulting from the primary filter location with existing systems. Because of the large amount of fines which are separated from the normal material flow, the primary filter in existing systems often must be located within the primary receiver, often eight to twelve feet above the floor level. Thus maintenance persons must often climb to this upper location in order to change or clean the filters.

The present invention includes a material loading device having an improved primary receiver-separator with a plurality of zones wherein the lightweight fines are removed from the transporting air stream thus overcoming or, in the least, greatly alleviating the above mentioned problems. Specifically, because of the greater degree of removal of entrained lightweight fines from the flowing airstream, the inclusion of means in the receiver-separator of the present invention for depositing a significant portion of the collected lightweight fines into the main flow stream without passing through a filter media and the fact that only a relatively small portion of the fines from the transmitted material must be passed through a dust filter, or will be entrained in the airstream exiting from the loader, the following advantages are obtained: greater time intervals between filter maintenance (i.e. once a week in many devices transporting 500 pounds of material per hour); ease of maintenance for the primary filter can be relocated at ground level and a single filter can service several material transporting devices; and efficient and smooth material flow and operation of the vacuum pump.

Accordingly, it is one object of this invention to provide a new and improved material loading device for granular or pulverant material having improved means for handling the lightweight fines associated with the transported material and including means for separating all of the fines from a transporting airstream and reintroducing the fines to the main material flow.

Another object of the invention is to provide a new and improved material loading device wherein the primary dust collecting filter may be relocated adjacent a floor level location.

A still further object of this invention is to provide a new and improved material loading device wherein a single dust collecting filter may be utilized for a plurality of loading devices.

These and other objects of the present invention will become more readily apparent upon a reading of the following description and drawings of presently preformed embodiments in which.

Figure 1:
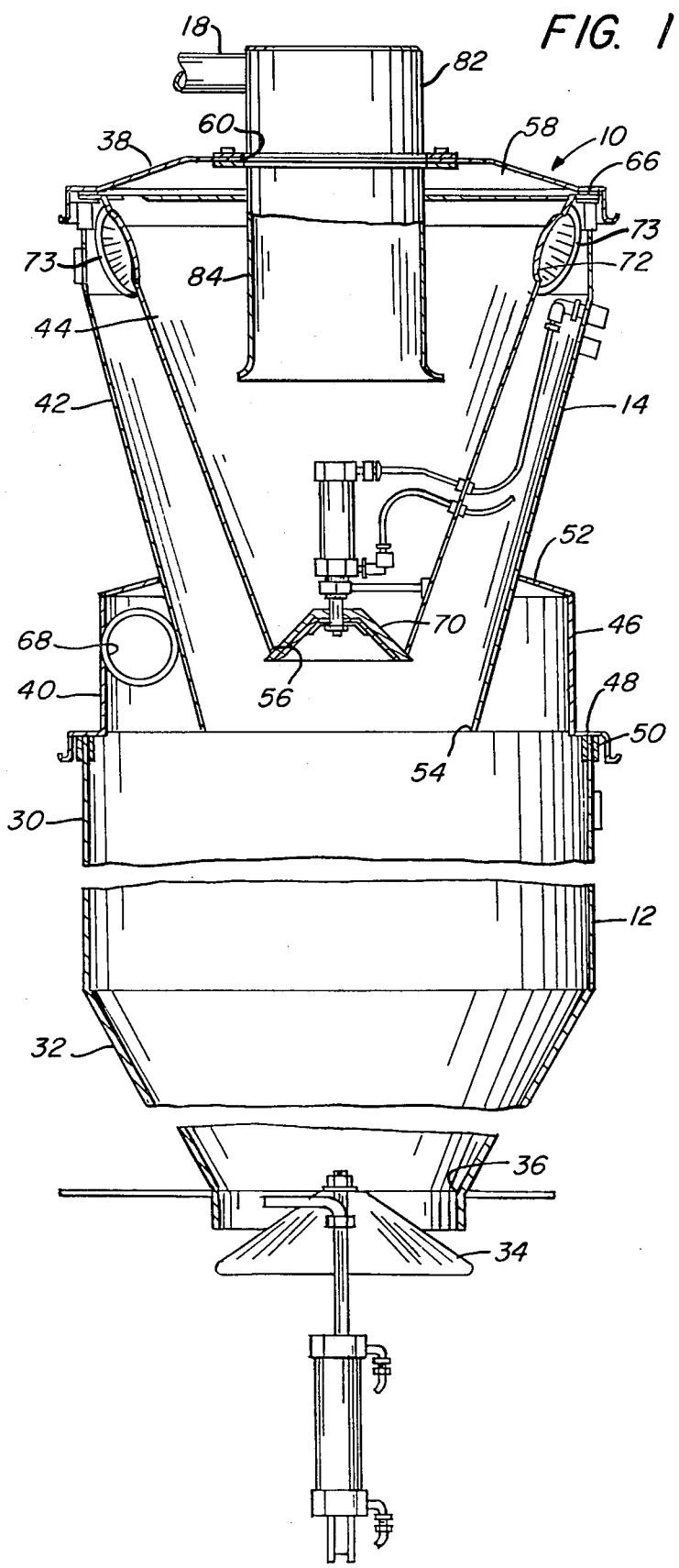
FIG. 1 is a longitudinal cross-sectional view of a material loading device constructed in accordance with the principles of the present invention.
Figure 3:
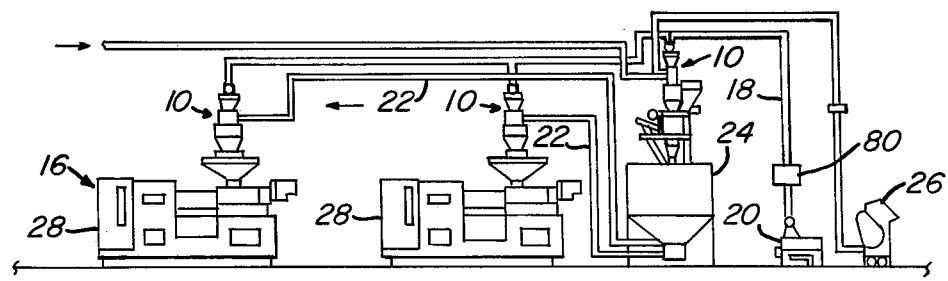
FIG. 3 is a schematic representation of a plastic processing system which utilizes a plurality of the material loading devices of the present invention.

FIGS. 1 and 3 illustrate a loader 10 of the present invention which, in use, is vertically oriented and comprises a lower primary receiving hopper 12 and an upper secondary receiving and separating hopper 14.

Loader 10 is of the type utilized to transport finely divided, granular or pulverant material and is illustrated in FIG. 3 as being in use in a plastic processing system 16 wherein loader 10 has suction provided thereto through a conduit 18 which communicates between the secondary hopper 14 and a pump 20 to provide the necessary suction to create an airflow to transport material to be processed through a conduit 22 which communicates between the loader 10 and a storage hopper 24 or bin 26. In the processing system 16 of FIG. 3 the material which is transported to loader 10 is then discharged therefrom for subsequent processing or storage, such as into a plastic processing machine 28 or into storage hopper 24. It is understood, but not shown, that various valving arrangements may, if desired, be used in conjunction with conduits 18 and 22 to further control the airflow and flow of materials to the various loaders 10 illustrated in FIG. 3.

The lower primary receiving hopper 12 comprises an upper cylindrical body portion 30 and an inverted generally frusto conical lower body portion 32 which extends coaxially downwardly from portion 30. A conical valve assembly 34 is provided adjacent the lower discharge opening 36 of body portion 32. Valve assembly 34 is selectively actuatable to close off and uncover opening 36 to control the discharge of process material therefrom into processing equipment such as machine 28. Inasmuch as the configuration of chamber 12 as well as the operation and configuration of the discharge valve assembly 34 are generally well known in the art and have been previously shown and described in various prior art patents such as U.S. Pat. Nos. 3,273,943 and 3,635,377, further description thereof is not necessary for an understanding of this invention by one skilled in the art.

The secondary receiving and separating hopper assembly, generally indicated at 14 and hereinafter referred to as hopper 14 comprises: upper and lower vertically spaced end members 38 and 40, respectively; an outer inverted frusto conical shaped body member 42, and an inner inverted frusto conical hopper member 44 which is received within member 42, is coaxial with respect to member 42 and has the outer surfaces thereof transversely spaced from adjacent inner surfaces of member 42 to thereby form a passageway therebetween. Lower end member 40 includes a vertically extending generally cylindrical main body portion 46 having a diameter thereof slightly less than the diameter of body portion 30 of hopper 12 and greater than the diameter of transversely adjacent portions of outer body member 42. A flange 48 extends radially outwardly from portion 46 adjacent the lowermost end thereof and includes circumferentially extending seating portions 50 extending downwardly therefrom. Portions 50 are cooperable with an upper circumferential section of body portion 30 for the seating and supporting of hopper 14 by hopper 12. Lower end member 40 additionally includes an annular generally transversely extending closure portion 52 which has the outer periphery therof secured to the uppermost surface of body portion 46 and which extends radially inwardly therefrom to have the inner periphery thereof secured to an adjacent outer peripheral surface of the outer conical body member 42.

Thus, with such a structure and arrangement as described above, the lower end member 40 supports the portion of the hopper 14 upwardly therefrom, which hopper 14 is, in turn, releasably seated and supported by the primary receiving hopper 12 at the flange and seating portions 48 and 50, respectively. Furthermore, as illustrated in FIG. 1, when secondary hopper 14 is seated on hopper 12 the lowermost opening 54 of outer conical body member 42 is in substantial transverse alignment with the uppermost end of hopper 12 and lowermost opening 56 of inner conical hopper member 44 is spaced upwardly from opening 54.

Upper end member 38 includes a generally transversely extending portion 58 having a central opening 60 therein for receiving exit cylinder portion 84 downwardly therethrough and a conduit connecting cylinder portion 82 upwardly adjacent thereto. In operation, a vacuum pump conduit, such as conduit 18, communicates between portion 82 and a vacuum pump 20. A circumferentially extending flange and connection portion 66 extends outwardly from main portion 58 and is structured to cooperate with the upper ends of conical members 42 and 44 to secure and seal the upper end of secondary hopper 14.

A material transporting conduit such as conduit 22, communicates with loader 10 through an opening 68 which extends through cylindrical main body portion 46 of lower end member 40. Secondary hopper 14 additionally includes a conical valve assembly 70 adjacent the opening 56 of inner conical member 44. Valve assembly 70 is selectively actuatable to close off and uncover opening 56 to control the discharge of material which has collected within inner conical member 44. The discharge of such material is from member 44 downwardly into the primary receiving hopper 12. Valve assembly 70 is of a generally well known configuration and is similar in structure and operation to valve assembly 34 discussed hereinbefore and illustrated in U.S. Pat. No. 3,635,377.

The general sequence of operation of a loader 10 of a general configuration as described hereinabove is as follows:

1. Pump 20 is energized to create an airflow from the material storage areas, such as hopper 24 and bin 26 and through loader 10.

2. Conic valve assemblies 34 and 70 are energized by suitable means, not shown, to move upwardly and respectively seal openings 36 and 56.

3. The airflow through conduit 22 transports the material to be processed to opening 68 and into loader 10.

4. The airflow with the material suspended therein enters loader 10 at a location which impinges at the adjacent outer surface of conical member 42 and/or results in a cyclonic type flow in the annular space between the outer surface of member 42 and the transversely spaced inner surface of body portion 46. This impingement and/or cyclonic type flow, as well as the turbulance created thereby, results in a portion of the lightweight fines which would normally be entrained in the airstream, being precipitated out or removed from such entrainment and flowing with the material stream to the primary receiving hopper 12. A variety of factors will result in this removal of the entrained fines from the airstream, for example: fines being carried by the heavier particles to the hopper 12; agglomeration because of the turbulant action; adhering to the surrounding wall surfaces and eventually being carried to the hopper 12 by subsequent material flow or artificially induced vibration after cessation of the vacuum; and the like.

5. The airflow now proceeds downwardly into the primary hopper 12, undergoes a reversal of direction and is drawn upwardly into the annular space between the conical members 42 and 44. This direction reversal results in a still further proportion of the entrained lightweight fines precipitating out of the airstream because the momentum of the fines is substantially decreased.

The decrease in momentum results in gravity overcoming the suction forces with respect to at least a further portion of the entrained fines at this area of airstream reversal.

6. The airstream proceeds upwardly between conical members 42 and 44 in a somewhat turbulent fashion. This turbulent flow results from the turbulent introductory flow at the lower end of members 42 and 44 as well as the fact that the airstream will enter conical member 44 through a plurality of circumferentially spaced openings 72 which extend transversely through conical member 44 adjacent the upper end thereof. Thus a portion of the remaining entrained fines will be precipitated from the airstream because of agglomeration, adhering to adjacent wall surfaces and the like.

7. The airstream again reverses direction and flows through openings 72 and into inner conical member 44. The change in momentum at this point will result in a further removal of the entrained fines from the airstream. Furthermore, as illustrated, scoop shaped members 73 are carried by member 44 adjacent respective openings 72. Thus the airstream entering through openings 72 will have a still further cyclonic action imparted thereto because of the converging blind and configuration of members 73. The above will tend to result in still further entrained fines precipitating from the airstream because of further loss of momentum as well as increased turbulence within the member 44. The fines which have been removed from the airstream will be retained within the lower sealed off portion of member 44.

8. The relatively small amount of fines, if any, which remains in the airstream being withdrawn from loader 10 through portion 84 is filtered therefrom by a suitable final filter assembly such as downstream filter 80. Downstream filter 80 is schematically illustrated in FIG. 3 as being inserted in conduit 18, adjacent the pump 20. In the FIG. 3 illustration the single filter 80 acts as the only final filter for a plurality of loaders 10 and is positioned adjacent a readily accessible ground floor location.

Figure 2:
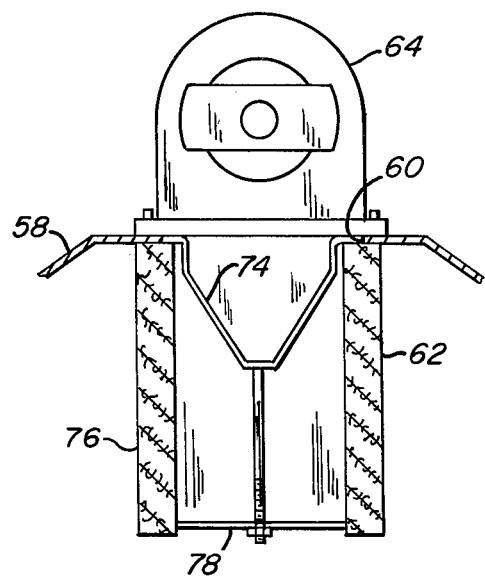
FIG. 2 is an enlarged detail view of an alternative configuration of a portion of the device illustrated in FIG. 1.

In the event that it is desired to have additional filtering adjacent the exit of the airstream from the loader 10, a filter assembly such as filter assembly 62 as is illustrated in FIG. 2 may be substituted for portions 84 and 82. In such a substitution filter assembly 62 is received downwardly through opening 60 and a conduit connecting assembly 64 extends upwardly therefrom. Filter assembly 62 may be of any suitable configuration; for example a flat cloth disc filter, a cartridge filter, a cloth bag filter or a metal screen filter. As illustrated in FIG. 2, filter assembly 62 is of a known cartridge type configuration consisting of a frame assembly 74 which supports a filter cartridge 76 and a lower closure member 78. With such a configuration the airflow exiting from loader 10 must first pass through filter cartridge 76 thus filtering out the last quantity of entrained fines from the exiting airstream.

9. Upon indication by suitable level sensing means (not shown) that a sufficient quantity of material has been received within loader 10, the pump 20 is de-energized and valve assemblies 34 and 70 are moved in a predetermined timed relationship to the respective downward positions thereof. Thus the fines within member 44 are discharged through opening 56 into hopper 12. Such fines, together with the primary material and other fines within hopper 12 are discharged from hopper 12 into the processing equipment, such as plastic processing machine 28. If desired, a vibratory means (not shown) may be included to vibrate the walls of member 44 and/or hopper 12 to aid in the material flow therefrom.

The embodiments described herein are the presently preferred embodiments of material loading devices constructed in accordance with the principles of the invention; however, it is understood that various modifications may be made to the embodiments described herein by those knowledgeable in the art without departing from the scope of the invention as is defined by the claims set forth hereinafter. For example: a pressure arrangement rather than suction may be utilized with the loader 10 of the present invention; vanes may be disposed within the annular vertically extending space intermediate members 42 and 44 and/or the interior of member 44 adjacent openings 72 to provide additional changes in flowpath and further precipitation of entrained fines from the airstream; the entire secondary receiving and separation hopper 14 may be retrofitted onto existing loaders, for example onto a loader such as is illustrated in U.S. Pat. No. 3,653,377 (in these instances it may be necessary to plug opening 68 or, in the alternative, to plug the existing opening in the loader being retrofitted and reconnect the input to opening 68); a vertically selectively movable plate may be positioned adjacent the lower end of portion 84 to increase or decrease the area through which the exiting airflow passes in exiting from loader 10 through the interior of portion 84; and the like.

We claim:

1. A device for receiving a granular or pulverant material transported thereto in suspension with a flowing airstream, with such material being deposited therein and such airstream being withdrawn therefrom comprising: first generally vertically oriented hopper means having entry inlet means adjacent an upper end portion thereof for permitting such airstream flow therein; second generally vertically oriented hopper means having a lower end portion thereof sealingly received within said upper end portion of said first hopper means and extending upwardly therefrom; said second hopper means including inner and outer transversely spaced vertically coaxially extending wall members; said outer wall member including downwardly open carryover inlet means at the lowr end thereof, said carryover inlet means being spaced downwardly from said entry inlet means, for permitting such airstream to flow within said second hopper means from said first hopper means; said inner wall member defining a hopper portion therewithin and including final inlet means therethrough adjacent the upper end thereof, which said final inlet means are transversely spaced from adjacent peripheral surfaces of the upper end portion of said outer wall member, for permitting such airstream to flow into said hopper portion from said carryover inlet means; outlet means communicating with said hopper portion for the withdrawal of such airstream from said second hopper means; and generally vertically extending passageway means defined between the spaced transversely adjacent surfaces of said inner and outer wall members to provide constant communication between said carryover inlet means and said final inlet means for the flow of such airstream therebetween.

2. A device as specified in claim 1 wherein said first and second hopper means are generally coaxial with respect to a vertically extending axis.

3. A device as specified in claim 2 wherein said inner and outer members each have a generally inverted frusto conical configuration.

4. A device as specified in claim 1 wherein said entry inlet means is oriented to provide a generally tangential introduction of such airstream into said first hopper means.

5. A device as specified in claim 4 wherein said final inlet means is oriented to provide a generally tangential introduction of such airstream into said hopper portion.

6. A device as specified in claim 1 additionally including selectively operable discharge means adjacent a lower end portion of said inner wall member for providing selective communication between said hopper portion and the interior of said first hopper means.

* * * * *